(12) United States Patent
Sogen

(10) Patent No.: US 10,162,364 B2
(45) Date of Patent: Dec. 25, 2018

(54) ROBOT AND CONTROL METHOD THEREOF

(71) Applicant: TOYOTA JIDOSHA KABUSHIKI KAISHA, Toyota-shi, Aichi-ken (JP)

(72) Inventor: Kiyohiro Sogen, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/111,562

(22) PCT Filed: Jan. 15, 2015

(86) PCT No.: PCT/IB2015/000027
§ 371 (c)(1),
(2) Date: Jul. 14, 2016

(87) PCT Pub. No.: WO2015/110889
PCT Pub. Date: Jul. 30, 2015

(65) Prior Publication Data
US 2016/0334802 A1  Nov. 17, 2016

(30) Foreign Application Priority Data

Jan. 24, 2014  (JP) ................................ 2014-011150

(51) Int. Cl.
G05D 1/02  (2006.01)
(52) U.S. Cl.
CPC .................. G05D 1/0274 (2013.01)

(58) Field of Classification Search
None
See application file for complete search history.

(56) References Cited

U.S. PATENT DOCUMENTS 9,488,469 B1 * 11/2016 Michael ................. G01B 11/25
2005/0253807 A1 * 11/2005 Hohmann ............... G06F 3/043
345/156
2010/0324769 A1  12/2010 Takaoka
(Continued)

FOREIGN PATENT DOCUMENTS

JP    6-126685   5/1994
JP    11-165291  6/1999
(Continued)

Primary Examiner — Shelley Chen
(74) Attorney, Agent, or Firm — Finnegan, Henderson, Farabow, Garrett & Dunner, LLP

(57) ABSTRACT

A robot includes a distance sensor configured to measure a distance to an object existing within a movement environment of the robot and autonomously operates based on the distance information measured by at least one of the distance sensor and a distance sensor installed within the movement environment. The robot includes an acquiring unit configured to acquire an operation region through which the robot passes when the robot performs an operation, a setting unit configured to set a measurement position of the distance sensor at which the operation region acquired by the acquiring unit is covered by a measurement region of the distance sensor, and a control unit configured to control the robot to operate based on the distance information measured by the distance sensor at the measurement position set by the setting unit.

9 Claims, 5 Drawing Sheets

(56) References Cited

U.S. PATENT DOCUMENTS

| | | | | |
|---|---|---|---|---|
| 2013/0187814 A1* | 7/2013 | Direen | ................... | G01R 29/10 |
| | | | | 343/703 |
| 2013/0245828 A1 | 9/2013 | Tateno et al. | | |
| 2013/0325243 A1* | 12/2013 | Lipkowski | ............. | G05D 1/024 |
| | | | | 701/25 |

FOREIGN PATENT DOCUMENTS

| | | |
|---|---|---|
| JP | 2002-264070 | 9/2002 |
| JP | 2003-300186 A | 10/2003 |
| JP | 2004-255552 A | 9/2004 |
| JP | 2006-205343 A | 8/2006 |
| JP | 2008-023630 A | 2/2008 |
| JP | 2008-126333 A | 6/2008 |
| JP | 2008-197884 | 8/2008 |
| JP | 2010-15194 | 1/2010 |
| JP | 2013-217893 A | 10/2013 |

* cited by examiner

ROBOT AND CONTROL METHOD THEREOF

CROSS-REFERENCE TO RELATED APPLICATIONS

This application is a national phase application of International Application No. PCT/162015/000027, filed Jan. 15, 2015, and claims the priority of Japanese Application No. 2014-011150, filed Jan. 24, 2014, the content of both of which is incorporated herein by reference.

BACKGROUND OF THE INVENTION

1. Field of the Invention

The invention relates to an autonomously operating robot and a control method thereof.

2. Description of Related Art

A map generation method for generating an environment map which specifies obstacle regions and robot movable regions, specifically a map generation method for generating a new environment map by integrating movable regions in an old environment map is disclosed (see, e.g., Japanese Patent Application Publication No. 2008-197884 (JP 2008-197884 A)).

SUMMARY OF THE INVENTION

In the aforementioned map generation method, the environment map is updated at all times. The update of the environment map is performed with respect to all the movable regions. This may possibly lead to an increase in the processing time and the storage capacity. In view of such a problem, the invention provides a robot capable of reducing the processing time and the storage capacity, and a control method thereof.

One aspect of the invention is directed to a robot, including: a distance sensor configured to measure a distance to an object existing within a movement environment of the robot, the robot autonomously operating based on the distance information measured by at least one of the distance sensor and a distance sensor installed within the movement environment, an acquiring unit configured to acquire an operation region through which the robot passes when the robot performs an operation, a setting unit configured to set a measurement position of the distance sensor at which the operation region acquired by the acquiring unit is covered by a measurement region of the distance sensor, and a control unit configured to control the robot to operate based on the distance information measured by the distance sensor at the measurement position set by the setting unit. Thus, only when the operation of the robot is needed, only the operation region required for the operation is checked. It is therefore possible to effectively reduce the processing time and the storage capacity.

In one aspect of the invention, when it is determined that the robot can operate within the operation region without making contact with an obstacle based on the distance information measured by the distance sensor at the measurement position, the control unit may perform the operation without identifying the obstacle by orienting a measurement direction of the distance sensor toward a travel direction of the robot. Thus, within the operation region, the robot can safely and rapidly perform a specified operation without having to detect an obstacle with the distance sensor.

In one aspect of the invention, the setting unit may set the measurement position of the distance sensor such that a projection area of the robot becomes smallest when the robot is projected on a road surface. This makes it possible to reliably prevent the robot from making contact with an obstacle existing in an unknown region within the movement environment even when the robot is operated.

In one aspect of the invention, the robot may further include a head unit on which the distance sensor is installed, and a body unit on which the head unit is rotatably installed. The setting unit may set the measurement position of the distance sensor by rotating the head unit or by moving at least one of the head unit and the body unit up or down. This makes it possible to appropriately set the measurement position of the distance sensor while reliably preventing the robot from making contact with an obstacle existing in an unknown region within the movement environment.

In one aspect of the invention, the robot may further include a generating unit configured to generate an environment map of the operation region based on the distance information measured by the distance sensor at the measurement position set by the setting unit. This enables the robot to accurately perform the operation using the environment map of the operation region.

In one aspect of the invention, the robot may further include a storage unit configured to store the measurement position of the distance sensor set by the setting unit on an operation-by-operation basis. Thus, it is possible to, during the operation of the robot, read the measurement position of the distance sensor corresponding to the operation from the storage unit and to check the operation region within a short period of time.

Another aspect of the invention is directed to a control method of a robot which includes a distance sensor configured to measure a distance to an object existing within a movement environment of the robot, the robot autonomously operating, based on the distance information measured by at least one of the distance sensor and a distance sensor installed within the movement environment, the control method including: acquiring an operation region through which the robot passes when the robot performs an operation, setting a measurement position of the distance sensor at which the acquired operation region is covered by a measurement region of the distance sensor, and controlling the robot to operate based on the distance information measured by the distance sensor at the set measurement position.

According to the invention, it is possible to provide a robot capable of reducing the processing time and the storage capacity, and a control method thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
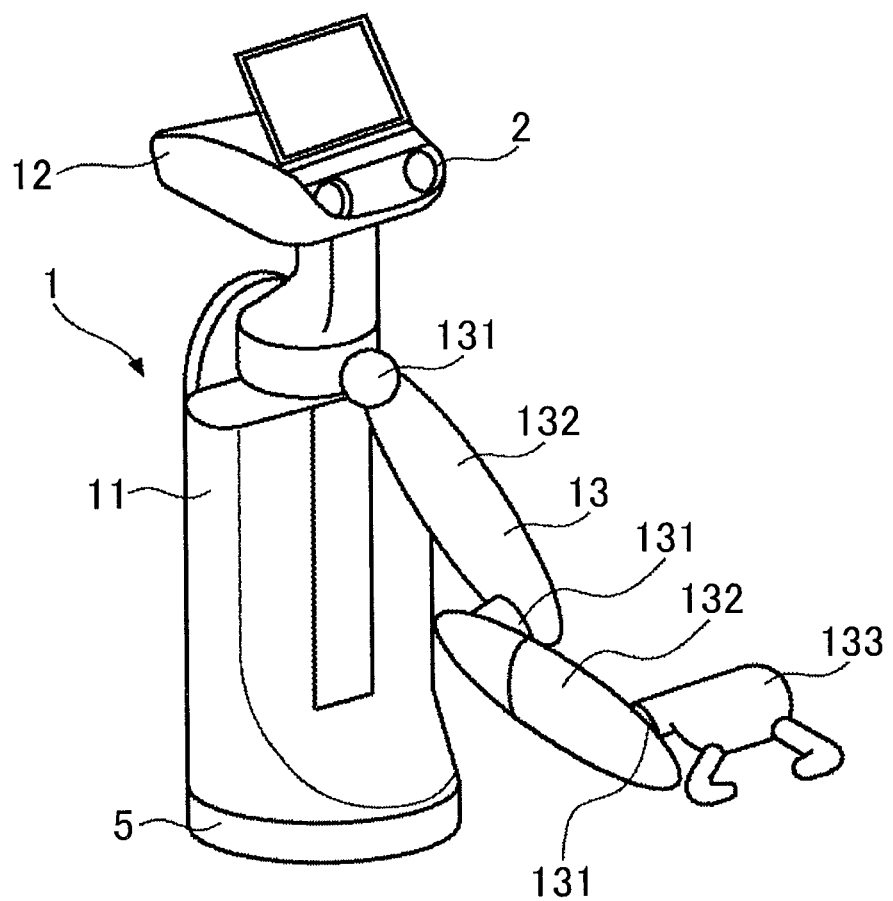
FIG. 1 is a perspective view showing a schematic configuration of a robot according to one embodiment of the invention.
Figure 2:
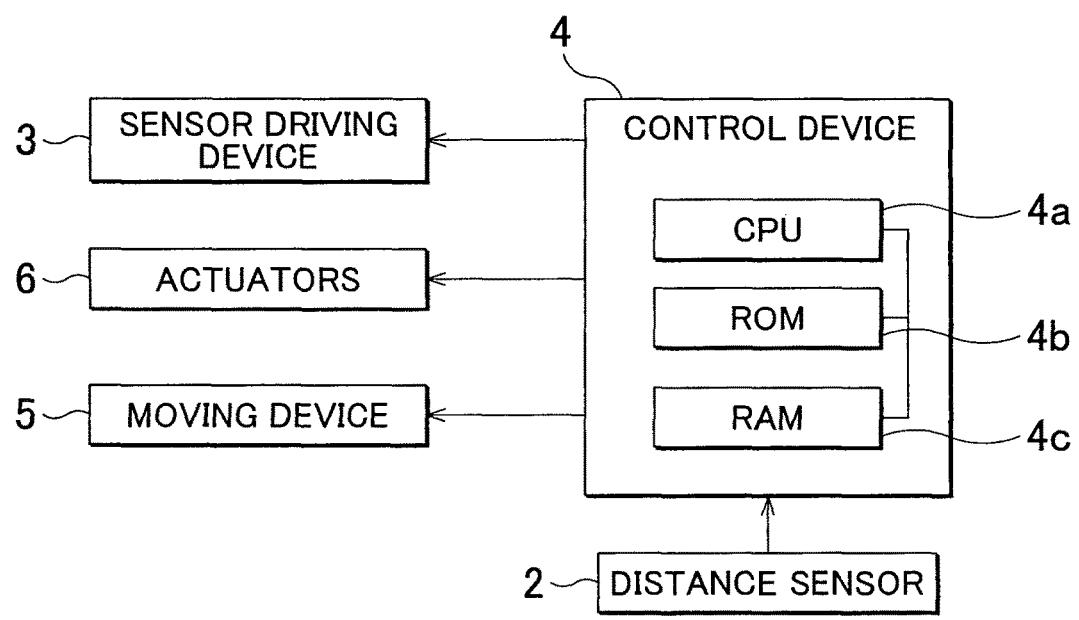
FIG. 2 is a block diagram showing a schematic system configuration of the robot according to one embodiment of the invention.

An embodiment of the invention will now be described with reference to the accompanying drawings. FIG. 1 is a perspective view showing a schematic configuration of a robot according to one embodiment of the invention. FIG. 2 is a block diagram showing a schematic system configuration of the robot according to one embodiment of the invention. A robot 1 according to the present embodiment is configured by, e.g., an autonomous robot which moves autonomously and performs a specified task such as moving an object or a task of opening and closing a door or a refrigerator. The robot 1 includes a substantially columnar body unit 11, a head unit 12 rotatably installed on the body unit 11, and an arm unit 13 installed in the body unit 11.

An extension/retraction mechanism for extending and retracting the body unit 11 in an up-down direction is installed in the body unit 11. A moving device 5 for moving the robot 1 is installed in a lower end portion of the body unit 11. The moving device 5 moves the robot 1 in a front-rear direction and a left-right direction by rotating wheels. The arm unit 13 is configured as an articulated arm which includes a plurality of joints 131 and a plurality of links 132. A grip unit 133 capable of gripping an object or the like is installed at the tip of the arm unit 13. Actuators 6, such as servo motors or the like, which drive the respective joints 131 and the grip unit 133 are installed in the respective joints 131 and the grip unit 133. The configuration of the robot 1 mentioned above is nothing more than one example. Thus, the invention is not limited thereto. The robot 1 may have any arbitrary configuration as long as the robot 1 can move autonomously and can perform a specified task.

The robot 1 includes a distance sensor 2, a sensor driving device 3, a control device 4, a moving device 5 and actuators 6 (see FIG. 2).

The distance sensor 2 is, e.g., a camera, an ultrasonic sensor, a laser sensor, a laser range finder, or a distance image sensor (a sensor including an RGB camera, a depth sensor, a multi-array, microphone and the like).

The sensor driving device 3 moves the distance sensor 2 to adjust the position and orientation of the distance sensor 2. For example, the sensor driving device 3 adjusts the position and orientation of the distance sensor 2 by driving the extension/retraction mechanism of the body unit 11 to extend or retract the body unit 11 or by driving a neck joint to rotate the head unit 12 or move the head unit 12 up and down.

The control device 4 controls the sensor driving device 3, the actuators 6 of the respective joints 131 and the moving device 5. The control device 4 controls the actuators 6 of the respective joints 131 of the arm unit 13 and the moving device 5 based on an environment map which indicates a movement environment of the robot 1 (the positions and shapes of obstacles, the moving route, etc.), thereby causing the robot 1 to move autonomously and to perform a specified task.

The control device 4 has a hardware configuration including microcomputer as a main component which includes a CPU (Central Processing Unit) 4a for performing, e.g., control processing, arithmetic processing and the like, a ROM (Read Only Memory) 4b for storing a control program, a calculation program and the like to be executed by the CPU 4a, and a RAM (Random Access Memory) 4c for temporarily storing process data and the like.

In the case where a robot performs a specified task, it is possible to prepare, and hold an environment map in advance. However, in reality, the environment may change from time to time due to an emergence of a new obstacle or other causes. For that reason, there is a need to update the environment map at all times. In this case, an increase in the processing time and the storage capacity becomes a problem.

Considering the problem, the control device 4 according to the present embodiment acquires an operation region through which the robot 1 passes during the operation thereof, sets a measurement position of the distance sensor 2 at which the operation region is covered by a measurement region of the distance sensor 2, moves the distance sensor 2 to the measurement position thus set and generates an environment map of the operation region based on the distance information measured by the distance sensor 2 at the measurement position. Then, the control device 4 controls the robot 1 such that the robot 1 operates based on the environment map thus generated.

Thus, the environment map is not always updated. Only when a particular operation of the robot 1 is needed, only a portion of the environment map for the operation region required in the particular operation is updated without having to update the entire environment map. It is therefore possible to effectively reduce the processing time and the storage capacity.

Figure 3:
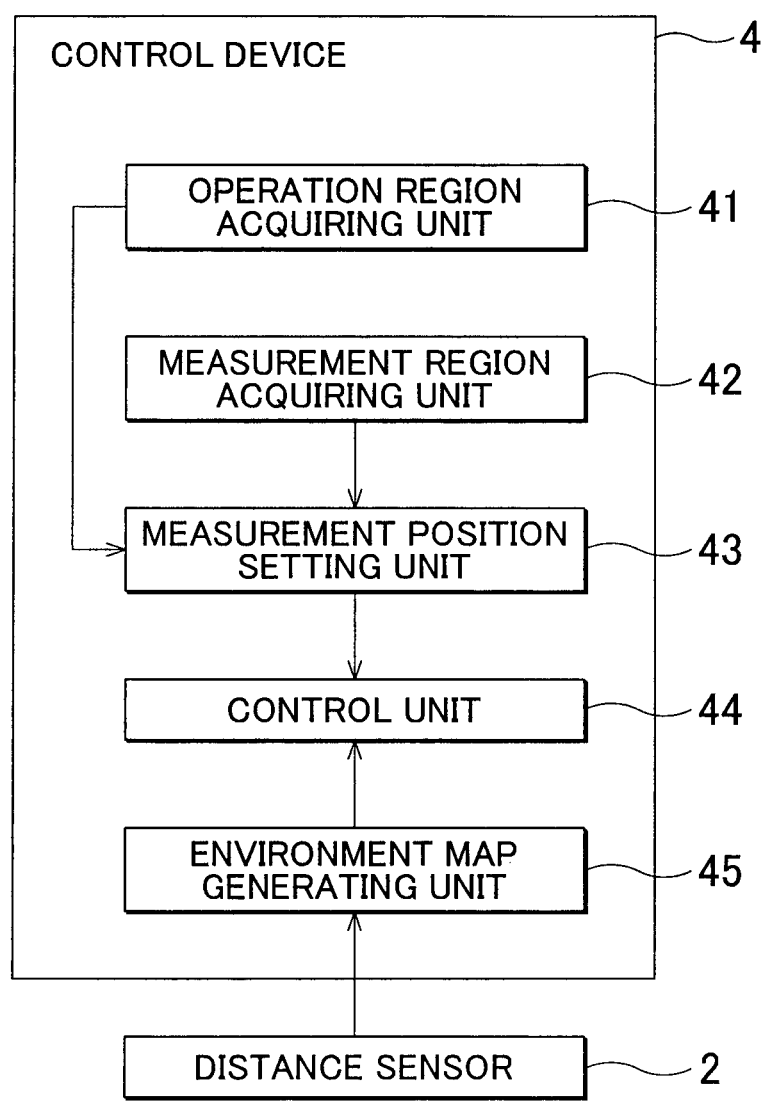
FIG. 3 is a block diagram showing a schematic system configuration of a control device according to one embodiment of the invention.

FIG. 3 is a block diagram showing a schematic system configuration of the control device according to the present embodiment. The control device 4 according to the present embodiment includes an operation region acquiring unit 41, a measurement region acquiring unit 42, a measurement position setting unit 43, a control unit 44 and an environment map generating unit 45.

The operation region acquiring unit 41, which is one specific example of an acquiring unit, acquires an operation region through which the body unit 11, the head unit 12 and the arm unit 13 of the robot 1 pass when the robot 1 performs a specified operation. The operation region acquiring unit 41 calculates an operation region for a specified operation based on, e.g., the movement route of the body unit 11 and the trajectory of the arm unit 13 when the robot 1 performs a specified operation, and the dimension of the robot 1. The operation region acquiring unit 41 rapidly calculates an operation region by calculating an operation plan of the robot 1 (a trajectory plan of the body unit 11, the head unit 12, the arm unit 13 and the like) using a well-known RRT (Rapidly-exploring Random Tree) method.

Figure 4:
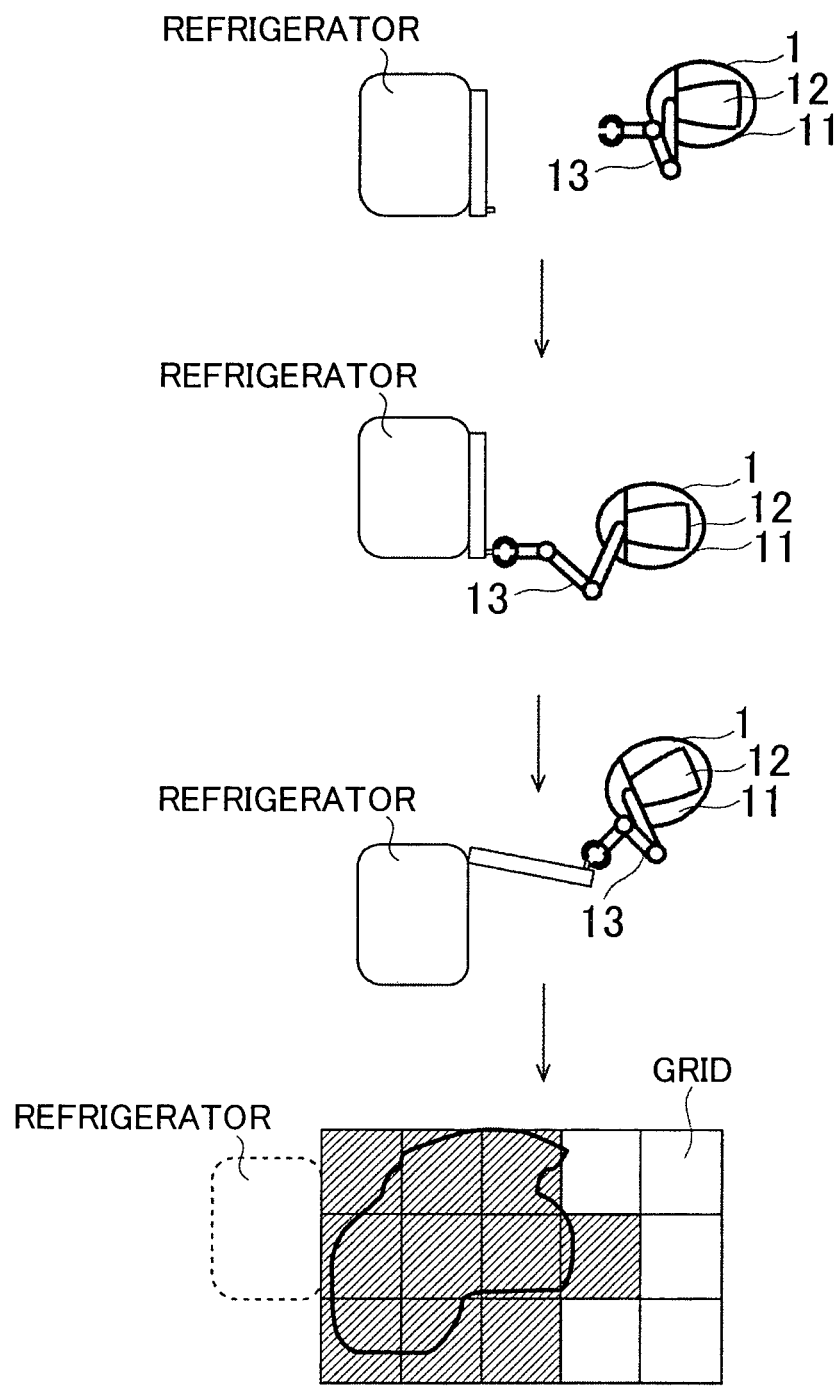
FIG. 4 is a view showing a grid group of a region through which a body portion and an arm portion of the robot pass during an opening operation of a refrigerator.

For example, it is assumed that the operation of the robot 1 is an opening operation of a refrigerator. In this case, as shown in FIG. 4, the operation region acquiring unit 41 acquires, as an operation region, a grid group (hatched portion) of a region through which the body unit 11, the head unit 12 and the arm unit 13 of the robot 1 pass in a three-dimensional grid space during an opening operation of a refrigerator.

Alternatively, on the basis of an operation target (such as a refrigerator, a door or the like), an operation region (a region through which the robot 1 passes around the operation target) may be previously set as a grid group in the ROM 4b or the RAM 4c. In this case, the operation region acquiring unit 41 acquires an operation region corresponding to a specified operation to be performed from the ROM 4b or the RAM 4c.

The measurement region acquiring unit 42 acquires a measurement region to be measured by the distance sensor 2. The measurement region of the distance sensor 2 is previously calculated from, e.g., the vertical and horizontal viewing angles of the distance sensor 2, and is set in the ROM 4b or the RAM 4c. The measurement region acquiring unit 42 acquires the predetermined measurement region of the distance sensor 2 from the ROM 4b or the RAM 4c.

The measurement position setting unit 43, which is one specific example of a setting unit, sets one or more measurement positions of the distance sensor 2 so that the operation region acquired by the operation region acquiring unit 41 is covered by the measurement region of the distance sensor 2 acquired by the measurement region acquiring unit 42.

The measurement position of the distance sensor 2 is specified by, e.g., three-dimensional coordinates using an operation target as an origin. However, the invention is not limited thereto. For example, the measurement position of the distance sensor 2 may be specified by the relative position of the robot 1 with respect to the operation target and the angles of the joints of the robot 1 (the angle of the neck joint, etc.).

For example, the measurement position setting unit 43 arbitrarily sets the measurement position of the distance sensor 2 with respect to the grid group of the operation region acquired by the operation region acquiring unit 41. The measurement position setting unit 43 excludes the grid of the operation region overlapping with the measurement region of the distance sensor 2 from the measurement position set as above. Subsequently, the measurement position setting unit 43 sets an additional measurement position with respect to the grid group of the operation region and excludes again the grid of the operation region overlapping with the measurement region of the distance sensor 2. The measurement position setting unit 43 repeats the setting of the measurement position of the distance sensor 2 and the excluding of the grid of the operation region overlapping with the measurement region. The measurement position setting unit 43 repeats the aforementioned processing until no grid to be excluded exists or until the grid area of the remaining operation region becomes equal to or smaller than a threshold value (until the operation region is covered by the measurement region of the distance sensor 2). The measurement position setting unit 43 sets the measurement position of the distance sensor 2 as a point. However, the invention is not limited thereto. The measurement position of the distance sensor 2 may be set as consecutive points (a line).

By setting the measurement position of the distance sensor in the aforementioned manner, it is possible to cover a wide operation region with the measurement region of a single distance sensor. Accordingly, there is no need to use a plurality of distance sensors. This leads to cost reduction.

The respective measurement positions of the distance sensor 2 are preferably set such that the robot 1 should not be moved by the moving device 5 when the distance sensor 2 is moved to the respective measurement positions. This makes it possible to reliably prevent the robot 1 from making contact with an obstacle existing in an unknown region within the environment even when the robot 1 is operated.

Thus, the measurement position setting unit 43 sets the respective measurement positions of the distance sensor 2 such that the robot 1 should not be moved by the moving device 5 and such that the projection area of the robot 1 should become smallest when the robot 1 is projected on a road surface. For example, the distance sensor 2 is installed on the head unit 12. In this case, the measurement position setting unit 43 sets the measurement position of the distance sensor 2 by rotating the head unit 12. In addition, the measurement position setting unit 43 sets the measurement position of the distance sensor 2 by moving at least one of the head unit 12 and the body unit 11 up or down.

The control unit 44, which is one specific example of a control unit, controls the sensor driving device 3, the respective actuators 6 of the arm unit 13 and the moving device 5 based on the environment map and the measurement position of the distance sensor. 2 set by the measurement position setting unit 43. By controlling the sensor driving device 3, the control unit 44 moves the distance sensor 2 to the measurement positions set by the measurement position setting unit 43. The distance sensor 2 measures distances at the respective positions to which the distance sensor 2 is moved.

The environment map generating unit 45, which is one specific example of a generation unit, generates an environment map of an operation region by integrating the distance information measured by the distance sensor 2 at the respective measurement positions. The environment map generating unit 45 generates, e.g., a rectangular solid group, based on the distance information measured by the distance sensor 2 at the respective measurement positions, and generates a three-dimensional environment map of an operation region using the rectangular solid group thus generated.

The control unit 44 controls the arm unit 13 and the moving device 5 based on the three-dimensional environment map of the operation region generated by the environment map generating unit 45, such that the robot 1 performs a specified operation. As described above, the operation region in which the robot 1 performs a specified operation is reliably recognized and only the environment map of the grasped operation region is accurately generated. Accordingly, it is possible to reliably prevent the robot 1 from colliding with an obstacle during the specified operation of the robot 1. This leads to an increase in safety.

The environment map generating unit 45 may not generate the environment map of the operation region and may identify the existence or nonexistence of an obstacle within the operation region based on the distance information measured by the distance sensor 2 at the respective measurement positions. Then, the environment map generating unit 45 may output the identification result to the control unit 44. If it is determined based on the identification result that an obstacle does not exist within the operation region and further that a specified operation can be performed, the control unit 44 performs a specified operation pursuant to an operation plan. Thus, the processing is simplified. This leads to a reduction in calculation time.

I When it is determined that the robot 1 can operate within the operation region without making contact with an obstacle based on the three-dimensional environment map of the operation region generated by the environment map generating unit 45, the control unit 44 performs a specified operation without identifying an obstacle by orienting the measurement direction of the distance sensor 2 toward the travel direction of the robot 1. Thus, within the operation region, the robot 1 can safely and rapidly perform a specified operation without having to detect an obstacle with the distance sensor 2.

For example, when performing an operation of opening a door of a refrigerator, the robot 1 usually opens the door while moving backward (see FIG. 4). At this time, if it is determined that the robot 1 can operate within the operation region without making contact with an obstacle, the control unit 44 can directly move the robot 1, backward without identifying an obstacle by orienting the distance sensor 2 such as a camera or the like backward. In general, when a robot is moved in a direction differing from a measurement direction of a distance sensor for detecting an obstacle, difficulty is involved from the viewpoint of safety. However, according to the present embodiment, the robot 1 can identify an obstacle, which exists within the operation region during the opening operation of a refrigerator, from the environment map generated in advance. Thus, the robot 1 can safely and rapidly move backward regardless of the measurement direction of the distance sensor 2.

Figure 5:
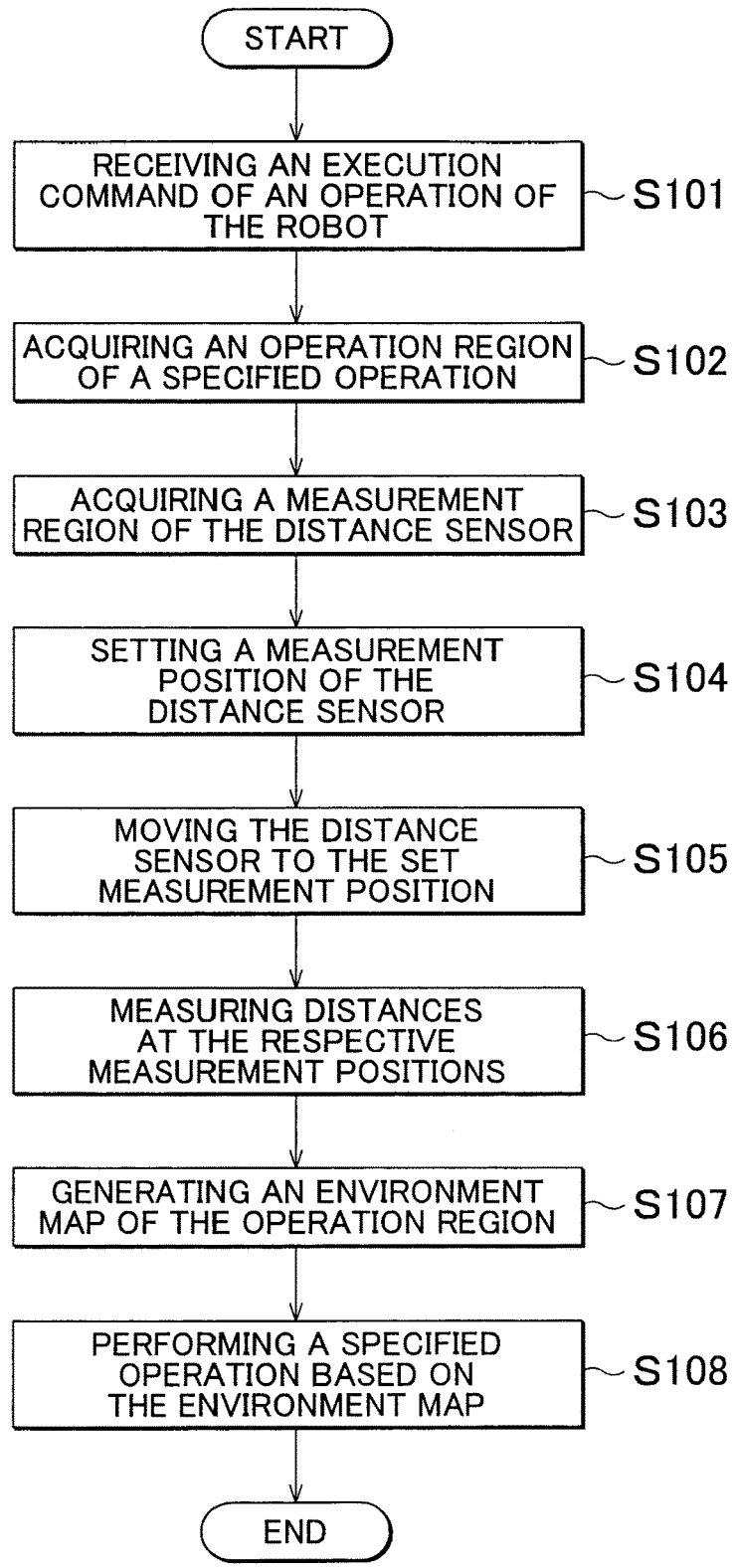
FIG. 5 is a flowchart illustrating a control flow of a robot control method according to one embodiment of the invention.

Next, a robot control method according to the present embodiment will be described in detail. FIG. 5 is a flowchart illustrating a control flow of a robot control method according to the present embodiment.

If the control device 4 receives an execution command of an operation of the robot 1 (Step S101), the operation region acquiring unit 41 of the control device 4 acquires an operation region through which the robot 1 passes during the operation thereof (Step S102). The measurement region acquiring unit 42 acquires a predetermined measurement region of the distance sensor 2 from the ROM 4b or the RAM 4c (Step S103).

The measurement position setting unit 43 sets measurement positions of the distance sensor 2 so that the operation region acquired by the operation region acquiring unit 41 is covered by the measurement region of the distance sensor 2 acquired by the measurement region acquiring unit 42 (Step S104).

By controlling the sensor driving device 3, the control unit 44 causes the distance sensor 2 to move to the measurement positions set by the measurement position setting unit 43 (Step S105). The distance sensor 2 measures distances at the respective measurement positions to which the distance sensor 2 is moved (Step S106). The environment map generating unit 45 generates an environment map of the operation region by integrating the distance information measured by the distance sensor 2 at the respective measurement positions (Step S107).

Based on the environment map of the operation region generated by the environment map generating unit 45, the control unit 44 calculates an operation plan using an RRT method or the like such that the robot 1 can operate while avoiding an obstacle existing within the environment. Pursuant to the operation plan, the control unit 44 controls the respective actuators 6 of the arm unit 13 and the moving device 5 (Step S108).

In the present embodiment described above, the operation region through which the robot 1 passes during the operation thereof is acquired. The measurement position of the distance, sensor 2 at which the operation region is covered by the measurement region of the distance sensor 2 is set. The distance sensor 2 is moved to the measurement position thus set. The robot 1 is controlled to operate based on the distance information measured by the distance sensor 2 at the measurement position to which the distance sensor 2 is moved. Thus, only when the operation of the robot 1 is needed, only the operation region required for the operation is checked. It is therefore possible to effectively reduce the processing time and the storage capacity.

The invention is not limited to the embodiment described above but may be appropriately modified without departing from the spirit of the invention.

In the embodiment described above, the measurement position setting unit 43 may previously set the respective measurement positions of the distance sensor 2 on an operation-by-operation basis and may store the respective measurement positions in the ROM 4b or the RAM 4c (one specific example of a storage unit).

When performing the operation of the robot 1, the control unit 44 reads the respective measurement positions of the distance sensor 2 corresponding to the operation of the robot 1 from the ROM 4b or the RAM 4c. By controlling the sensor driving device 3, the control unit 44 causes the distance sensor 2 to move to the measurement positions thus read. The distance sensor 2 measures distances at the respective measurement positions to which the distance sensor 2 is moved. The environment map generating unit 45 generates an environment map of the operation region by integrating the distance information measured by the distance sensor 2 at the respective measurement positions. In this way, during the operation of the robot 1, the measurement positions of the distance sensor 2 corresponding to the operation are read. This makes it possible to generate the environment map of the operation region within a short period of time.

In the embodiment described above, the distance sensor 2 is installed on the robot 1. However, the installation of the distance sensor 2 is not limited thereto. The distance sensor 2 may be installed within the environment. The measurement position setting unit 43 sets measurement positions of the distance sensor 2 installed within the environment. The distance sensor 2 is, e.g., one or more movable monitoring cameras installed within the environment. The measurement position setting unit 43 may set the measurement positions of the distance sensors 2 installed in the robot 1 and the environment.

In the invention, for example, the processing shown in FIG. 5 can be realized by causing the CPU 4a to execute a computer program.

The program can be stored in different types of non-transitory computer readable media and can be supplied to a computer. The non-transitory computer readable media include different types of tangible storage media. Examples of the non-transitory computer readable media include a magnetic recording medium (e.g., a flexible disk, a magnetic tape or a hard disk drive), a magneto-optical recording medium (e.g., a magneto-optical disk), a CD-ROM (Read Only Memory), a CD-R, a CD-R/W, and a semiconductor memory (e.g., a mask ROM, a PROM (Programmable ROM), an EPROM (Erasable PROM), a flash ROM, or a RAM (Random Access Memory)).

The program may be supplied to a computer by different types of transitory computer readable media. Examples of the transitory computer readable media include an electrical signal, an optical signal and an electromagnetic wave. The transitory computer readable media can supply the program to the computer via a wire communication path such as an electric wire, an optical fiber or the like, or a wireless communication path.

What is claimed is:

1. A robot, comprising:
  a distance sensor configured to measure a distance to an object existing within a movement environment of the robot, the robot autonomously operating based on a distance information measured by at least one of the distance sensor and a distance sensor installed within the movement environment;
  an acquiring unit configured to acquire an operation region comprising a grid group through which the robot passes when the robot performs an operation;

a setting unit configured to set a measurement position of the distance sensor at which the operation region acquired by the acquiring unit is covered by a measurement region of the distance sensor, wherein the setting unit is configured to perform setting of the measurement position of the distance sensor, comprising:
  setting a first measurement position of the distance sensor with respect to the grid group of the acquired operation region,
  excluding, from the first measurement position, a grid of the operation region overlapping with the measurement region of the distance sensor,
  setting an additional measurement position of the distance sensor with respect to the grid group of the acquired operation region,
  excluding, from the additional measurement position, an additional grid of the operation region overlapping with the measurement region of the distance sensor, and
  repeating the setting of the additional measurement position and the excluding from the additional measurement position until the operation region acquired by the acquiring unit is covered by the measurement region of the distance sensor; and
a control unit configured to control the robot to operate based on the distance information measured by the distance sensor at the measurement position set by the setting unit.

2. The robot according to claim 1, wherein when it is determined that the robot can operate within the operation region without making contact with an obstacle based on the distance information measured by the distance sensor at the measurement position, the control unit performs the operation without identifying the obstacle by orienting a measurement direction of the distance sensor toward a travel direction of the robot.

3. The robot according to claim 1, wherein the setting unit sets the measurement position of the distance sensor such that a projection area of the robot becomes smallest when the robot is projected on a road surface.

4. The robot according to claim 3, further comprising:
a head unit on which the distance sensor is installed; and
a body unit on which the head unit is rotatably installed,
wherein the setting unit sets the measurement position of the distance sensor by rotating the head unit or by moving at least one of the head unit and the body unit up or down.

5. The robot according to claim 1, further comprising:
a generating unit configured to generate an environment map of the operation region based on the distance information measured by the distance sensor at the measurement position set by the setting unit.

6. The robot according to claim 1, further comprising:
a storage unit configured to store the measurement position of the distance sensor set by the setting unit on an operation-by-operation basis.

7. A control method of a robot which includes a distance sensor configured to measure a distance to an object existing within a movement environment of the robot, the robot autonomously operating based on a distance information measured by at least one of the distance sensor and a distance sensor installed within the movement environment, the control method comprising:
  acquiring an operation region comprising a grid group through which the robot passes when the robot performs an operation;
  setting a measurement position of the distance sensor at which the acquired operation region is covered by a measurement region of the distance sensor, wherein setting the measurement position of the distance sensor comprises:
    setting a first measurement position of the distance sensor with respect to the grid group of the acquired operation region,
    excluding, from the first measurement position, a grid of the operation region overlapping with the measurement region of the distance sensor,
    setting an additional measurement position of the distance sensor with respect to the grid group of the acquired operation region,
    excluding, from the additional measurement position, an additional grid of the operation region overlapping with the measurement region of the distance sensor, and
    repeating the setting of the additional measurement position and the excluding from the additional measurement position until the acquired operation region is covered by the measurement region of the distance sensor; and
  controlling the robot to operate based on the distance information measured by the distance sensor at the set measurement position.

8. The robot according to claim 1, further comprising:
a moving device configured to move the robot in the movement environment of the robot;
an arm unit; and
a generating unit configured to generate an environment map of the operation region based on the distance information measured by the distance sensor at the measurement position set by the setting unit, wherein
the control unit is further configured to control the moving device and the arm unit based on the environment map generated by the generating unit such that the robot moves autonomously.

9. The control method of claim 7, wherein the robot further includes a moving device configured to move the robot in the movement environment of the robot and an arm unit, and wherein the method further comprises:
  generating an environment map of the operation region based on the distance information measured by the distance sensor at the set measurement position; and
  controlling the moving device and the arm unit based on the environment map such that the robot moves autonomously.

* * * * *